(No Model.)
C. F. BRIGHAM.
FIRE PROOF SHUTTER.
No. 312,549. Patented Feb. 17, 1885.
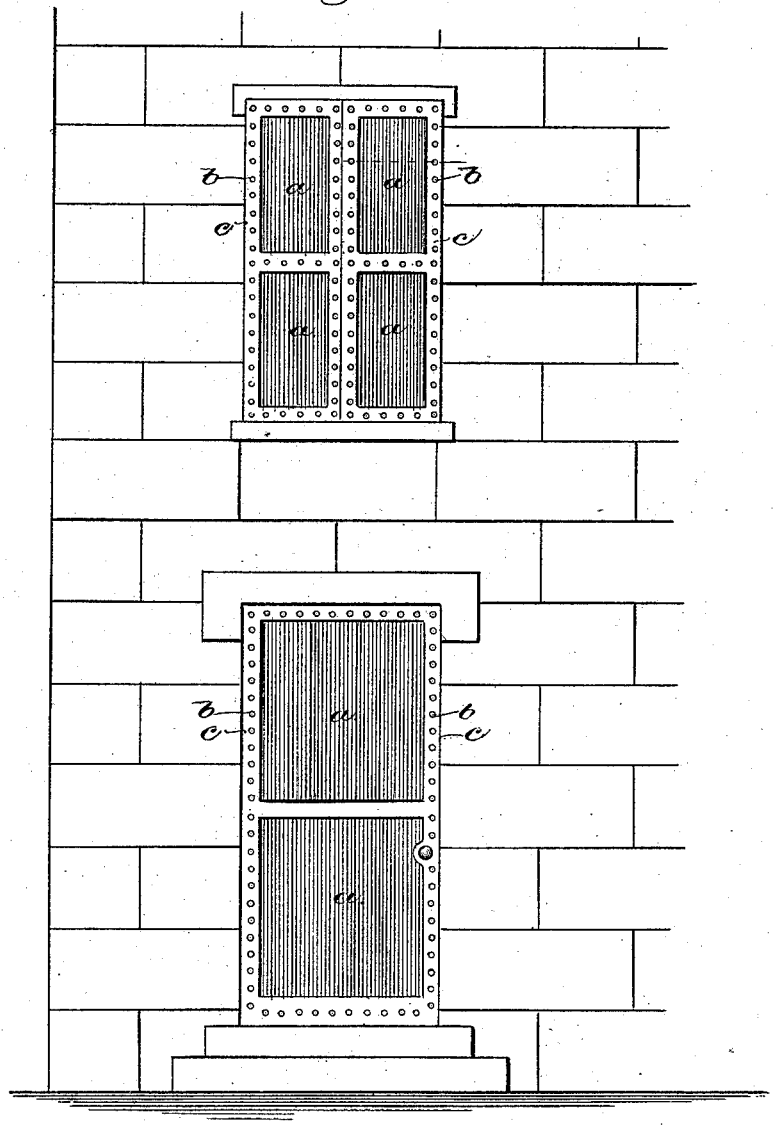

UNITED STATES PATENT OFFICE.

CHARLES F. BRIGHAM, OF BOSTON, MASSACHUSETTS, ASSIGNOR OF THREE-FOURTHS TO D. AUSTIN BROWN, TRUSTEE, OF SAME PLACE.

FIRE-PROOF SHUTTER.

SPECIFICATION forming part of Letters Patent No. 312,549, dated February 17, 1885.

Application filed May 12, 1884. (No model.)

*To all whom it may concern:*

Be it known that I, CHARLES F. BRIGHAM, of Boston, county of Suffolk, State of Massachusetts, have invented an Improvement in Fire-Proof Shutters and Doors, of which the following description, in connection with the accompanying drawings, is a specification, like letters on the drawings representing like parts.

This invention has for its object the production of a novel fire-proof shutter or door, composed, essentially, of asbestus treated with silicate of soda and chloride of calcium, and a metallic frame, as will be described.

Figure 1 in elevation represents a building provided with shutters and a door embodying my invention, and Fig. 2 a cross-section of one of the said shutters to represent its construction.

In accordance with my invention I take asbestus, sheathing-paper, or felting and saturate or treat it with silicate of soda, and thereafter the said asbestus material is treated with chloride of calcium, thus hardening and waterproofing the same. The asbestus material so prepared is then taken, cut into the shape desired for the shutter or door, and so as to form the central portion, *a*, or it may be the panels thereof. The portion *a* is then connected, by bolts *b* or otherwise, with a metal frame, *c*, there being preferably two such frames—one at the outer and the other at the inner side of the shutter or door. The metal in the metallic frames may be more or less stiff or rigid, preferably about from one-eighth to one-fourth of an inch in thickness, and as wide as may be desired. When two or more layers of asbestus material are used in one shutter or door, they will be united together by means of a fire-proof cement composed of fine clay tempered with silicate of soda.

A shutter or door constructed as stated will be substantially indestructible. I have described one way of making the asbestus material water-proof and rigid; but instead of silicate of soda and chloride of calcium I may employ any other suitable materials or ingredients to effect the same purpose.

I claim—

As an improved article of manufacture, a fire-proof shutter or door composed of asbestus material rendered fire and water proof, and of a metal frame, substantially as set forth.

In testimony whereof I have signed my name to this specification in the presence of two subscribing witnesses.

CHARLES F. BRIGHAM.

Witnesses:
G. W. GREGORY,
W. H. SIGSTON.